Dec. 15, 1959  J. M. HAMILTON  2,916,758
DRILL STEM WIPER
Filed Feb. 15, 1956
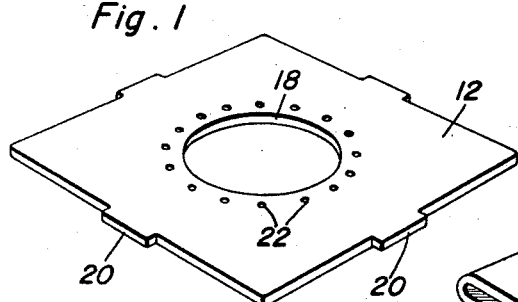
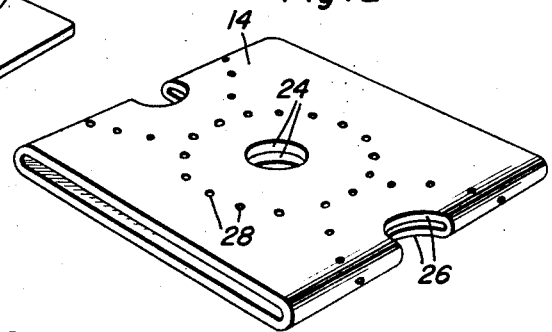
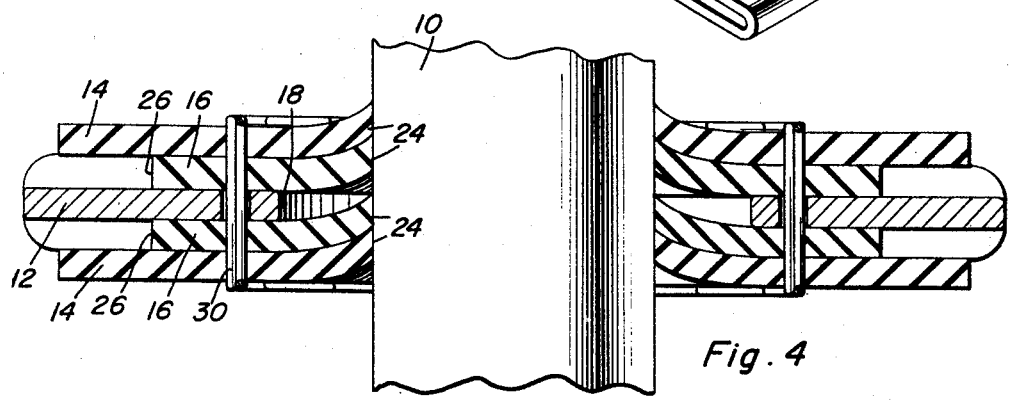
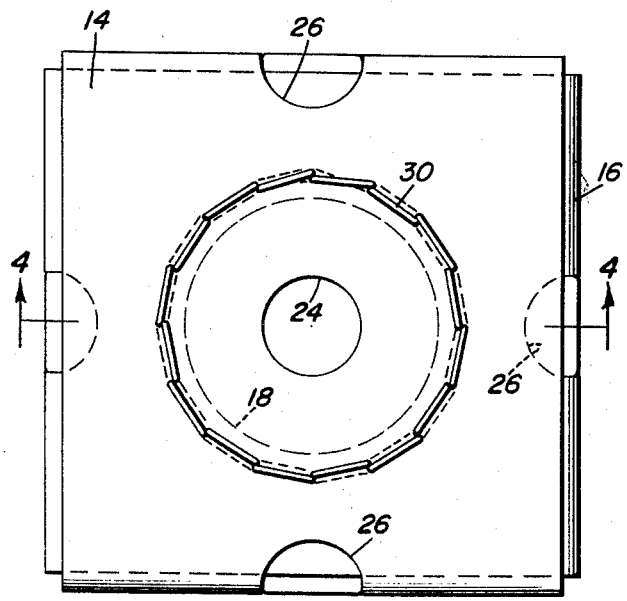
John M. Hamilton
INVENTOR.
BY
Attorneys

United States Patent Office 2,916,758
Patented Dec. 15, 1959

2,916,758
DRILL STEM WIPER

John M. Hamilton, Wilmington, Calif., assignor, by mesne assignments, to The Guiberson Corporation, Dallas, Tex., a corporation of Texas Application February 15, 1956, Serial No. 565,578

14 Claims. (Cl. 15—210)

This invention comprises novel and useful improvements in a drill stem wiper and more particularly relates to a device for wiping the drill stem, pump rods and similar elements of wells.

The principal object of this invention is to provide a wiper for scraping and wiping surplus oil and the like from reciprocating drill stems, pump rods and the like.

A further object of the invention is to provide a wiper which shall have a greatly improved and more efficient wiping engagement between the wiper members and the reciprocating rod with which they are intended to be utilized.

A further object of the invention is to provide a wiper in accordance with the foregoing objects which shall be capable of accommodating a wide variety of sizes of reciprocating rods to be wiped.

Yet another object of the invention is to provide a wiper in conformity with the above mentioned objects which will enable the use of a relatively inexpensive and durable and long lived material to be employed for the wiper; and wherein that portion of the device carrying the wiping surface may be successively interchangeably positioned to present a sequence of fresh wiping surfaces in order to compensate for wear.

A further and important object of the invention is to provide a wiping device in conformity with the previously mentioned objects which shall consist of a single plate constituting a base member and to which shall be secured in a greatly improved and easily applied or removed manner sheets of flexible material comprising the wiper members, together with improved means for removably securing the sheets to the plate in a readily interchangeable manner, and for positively securing the sheets to the plate adjacent the aperture receiving the reciprocating rod to be wiped, whereby to stiffen and reinforce the wiping action of the material upon the rod.

And a final important object of the invention to be specifically enumerated herein resides in the provision of a device in conformity with the immediately preceding object which will readily admit of the application of a plurality of the wiper sleeves to the base supporting plate of the device to thereby provide a multiple wiping action as desired.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of the base member or plate upon which the wiping elements are mounted and which may be removably applied to a well casing or the like in any desired manner;

Figure 2 is a perspective view of one of a plurality of wiper elements, each consisting of a sleeve or endless band of a flexible, pliable and/or resilient material and which is to be carried by the plate;

Figure 3 is a top plan view of the wiper device showing a pair of wiper elements secured to the plate and the position for receiving for wiping action a drill stem; and, Figure 4 is a vertical transverse sectional detailed view taken upon an enlarged scale substantially upon the plane indicated by the section line 4—4 of Figure 3 and showing the manner in which the wiper elements of the device cooperate with a reciprocating rod for wiping the same.

Disclosed in the accompanying drawing is a portion of a rod 10 such as a drill stem, pump rod or the like which is adapted to be reciprocated in a well bore such as in a well casing, and from which it is desired to wipe any oil or mud therefrom.

The wiper device to be applied to the reciprocating rod 10 for wiping the same consists essentially of a base 12 in the form of a plate of any desired size, together with a plurality of wiper elements 14 and 16, two being illustrated in the drawing although a plurality of elements may be provided as set forth hereinafter.

Referring to Figure 1, it will be seen that the plate 12 has been illustrated as being of substantially square cross-section, the same having a central aperture 18 of sufficient size to loosely receive a variety of sizes of rods 10. The plate 12 is provided with a plurality of pairs of oppositely disposed edges, there being two such pairs of edges in the square plate illustrated, although it will be understood that plates of different geometrical shape may be provided having a multiple number of pairs of oppositely disposed edges. In general, there will be one pair of oppositely disposed edges for each of the wiper elements 14 or 16, which are to be mounted upon the plate and form a part of the wiper device.

Each of the edges, preferably at its mid-portion, is provided with a lateral projection 20 comprising a retainer means whereby the wiper elements 14, 16 or the like are releasably and interchangeably and adjustably mounted upon the plate for embracing the same. As will be further noted, the plate is provided with a plurality of holes 22 disposed circumferentially about the aperture 18 and closely adjacent thereto, and constituting part of a securing means for positioning and mounting the wiper elements upon the plate as set forth hereinafter.

Reference is now made to Figure 2 for a consideration of the construction of each of the wiper elements, it being understood that the element 14 illustrated therein may be regarded as typical of any of a plurality of elements which may be mounted upon the plate 12. Each of the elements comprises an endless belt or sleeve of any suitable material of a flexible or pliable nature, and preferably of a stretchable nature as well, such as rubber or the like. Formed in the endless sleeve of the wiper elements are pairs of oppositely disposed openings 24 and 26. In the embodiment illustrated, there are two pairs of oppositely disposed apertures depicted, although in some instances it may be preferred to provide a greater number of pairs. Further, although the openings are shown disposed along a medial axis of the wiper element 14, it will be apparent that other spaces may be provided whereby to provide an increased number of pairs of oppositely disposed openings, it being understood that a corresponding increased number of and spacings of the retainer means 20 will also be provided.

Surrounding each of the openings 24 is a set of holes 28, and each set of these holes is complementary to the set of holes 22 in the plate 12 and constitutes part of a securing means to be hereinafter described.

In order to operatively mount the wiper element or elements 14, 16, etc. upon the plate 12, the sleeve, which may be stretched if of resilient material, is placed upon and caused to embrace the plate with one pair of openings such as the openings 24 disposed in registration with the aperture 18, it being understood that the portions of the sleeve carrying these openings are positioned upon opposite faces of the plate 12. When so placed, another pair of oppositely disposed openings such as those at 26 will be caused to seat upon and embrace an opposite pair of the retainer means 20 on the edges of the plate 12. Thus, while one set of openings is caused to register with the aperture 18, another set of openings constitutes part of a fastening means cooperating with the retainers 20 for securing and positioning the sleeve in proper position.

It will be observed that the diameter of the openings 24, 26, etc. is considerably less than that of the aperture 18 or less than the diameter of the rod 10 with which the wiper elements cooperate, as will be apparent from Figure 4. Consequently, when a wiper element is in place upon the plate, and the rod 10 extended through the registering openings 24, 18, the lip or perimeter of the openings will be caused to flex, as clearly indicated in Figure 4, and the opening will be stretched or distended in order to resiliently, and tightly and slidably embrace the rod 10.

A securing means in the form of a cable or the like as shown at 30 is then threaded through the two sets of openings 28 on the opposite portions of the wiper element 14 and through the set of openings 22 on the plate, in order to thereby firmly secure that portion of the wiper element which surrounds the aperture in firm contact with the opposite surfaces of the plate. This serves to rigidify and stiffen the wiper element and impart additional stiffness to the flexing of that portion or area of the wiper element which is immediately adjacent and surrounds the opening 24.

In some instances, the mounting of a single element 14 upon the plate will be found sufficient. However, whenever an increased wiping action is desired, an additional element or elements may be applied to the plate 12, each element being disposed at an angular relation to or crisscrossing the adjacent element as will be apparent from Figure 3. Where two elements are employed, the second element 16 may be disposed at right angles to the first element, as shown in Figure 3, and will be positioned in exactly the same manner, with one set of opposite openings engaging the retainer means 20, and another set of opposite openings registering with the aperture 18 to constitute and provide wiping surfaces for engaging the rod 10 within the aperture. The single securing means 30 will, of course, secure the plurality of wiper elements to the plate by means of the holes 22 in the plate and 28 in the wiper elements.

As will be understood, a plurality of the wiper elements may be mounted upon the plate 12 at corresponding angular disposition thereabout in order to provide a multiple of wiping surfaces engaging the rod 10.

When a wiping surface has been sufficiently abraded and worn to necessitate its replacement, the present invention permits a very easy renewing of the wiping surface to be effected. Thus, the securing means 30 may be removed and one or more of the wiper elements may be then released from their mounting upon the retainer means 20, rotated about the plate whereby a fresh and unworn set of the openings 24 or 26 are placed in registration with the aperture, and the retainer means 20 be again engaged in a set of openings to hold the wiper element in position. Thus, a single wiper element may be repeatedly used to provide fresh wiper surfaces, thereby greatly contributing to the length of wear of the device, enabling its efficiency of wiping action to be readily varied as desired.

From the foregoing, the construction and operation of the device may be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A wiper device for a reciprocable member extending into a well comprising, a supporting base having an aperture therethrough for loosely receiving the reciprocable member; a sheet of flexible material loosely extending about said base and having portions overlying the aperture on both sides of said base, said portions having openings of less diameter than the diameter of the reciprocable member and aperture, whereby the perimeter of said openings will tightly and slidably embrace and wipe the reciprocable member as it moves through the aperture; and means to disengagably attach the sheet to the base.

2. A wiper device for a reciprocable member extending into a well comprising, a supporting base having an aperture therethrough for loosely receiving the reciprocable member; a sheet of flexible material loosely extending about said base and having portions overlying the aperture on both sides of said base, said portions having openings of less diameter than the diameter of the reciprocable member and aperture, whereby the perimeter of said openings will tightly nad slidably embrace and wipe the reciprocable member as it moves through the aperture; means to disengagably attach the sheet to the base; and means for disengagably securing each of said portions to said base adjacent said aperture.

3. A wiper device for a reciprocable member extending into a well comprising, a supporting base having an aperture therethrough for loosely receiving the reciprocable member; a pair of sheets of flexible material extending about the base and each having portions overlying said aperture on both faces of said base, one of said sheets extending about the other sheet and being criss-crossed with relation thereto, said portions having aligned openings of less diameter than the diameter of the reciprocable member and the aperture whereby the perimeter of each opening will tightly and slidably embrace and wipe a reciprocable member as it moves through said aperture; and means to attach said sheets to said base.

4. A wiper device for a reciprocable member extending into a well comprising, a supporting base having an aperture therethrough for loosely receiving the reciprocable member; a pair of sheets of flexible material extending about the base and each having portions overlying said aperture on both faces of said base, one of said sheets extending about the other sheet and being criss-crossed with relation thereto, said portions having aligned openings of less diameter than the diameter of the reciprocable member and the aperture whereby the perimeter of each opening will tightly and slidably embrace and wipe a reciprocable member as it moves through said aperture; means to attach said sheets to said base; and means securing each of said portions to said base adjacent said aperture.

5. The combination of claim 1 wherein said sheet comprises an envelope.

6. The combination of claim 3 wherein each of said sheets comprises an envelope.

7. A wiper device for a reciprocable member extending into a well comprising, a supporting base having an aperture therethrough for loosely receiving a reciprocable member; a sleeve of flexible material extending about said base, said sleeve having at least two pairs of oppositely disposed openings of less diameter than the diameter of the reciprocable member and aperture whereby the perimeters of said openings will tightly and slidably embrace and wipe a reciprocable member movable through said aperture; retainer means on said base engaging in one pair of openings for holding the sleeve and another pair of openings in registration with said aperture, whereby the sleeve may be selectively secured by engagement of the retainer means with selected pairs of openings to cause interchangeable registration of said pairs of openings with said aperture.

8. The combination of claim 7 wherein said retainer means comprise projections extending from the edges of the base on opposite sides of the aperture.

9. A drill stem wiper comprising a plate having an aperture for loosely receiving a drill stem therethrough, a sleeve of flexible material embracing said plate, said sleeve having at least two pairs of oppositely disposed openings of less diameter than the diameter of the drill stem and aperture whereby the perimeters of said openings will tightly and slidably embrace and wipe a drill stem movable through said aperture, retainer means on said plate engaging in one pair of openings for holding the sleeve and positioning another pair of openings in registration with said aperture, whereby the sleeve may be selectively secured by engagement of the retainer means with selected pairs of openings to cause interchangeable registration of said pairs of openings with said aperture.

10. The combination of claim 9 including means securing the sleeve adjacent a pair of openings to both faces of the plate adjacent the aperture.

11. The combination of claim 9 including means securing the sleeve adjacent a pair of openings to both faces of the plate adjacent the aperture, said securing means comprising a circumferential series of holes in the plate surrounding the aperture, a complementary series of holes in the sleeve surrounding each opening, a fastener operatively secured in the plate holes and in the two series of sleeve holes which each surround an opening in registration with the aperture.

12. The combination of claim 9 wherein said retainer means comprises projections extending from the edges of the plate on opposite sides of the aperture.

13. A wiper element of the type described comprising, a flexible sleeve; two pairs of openings in the wall of the sleeve, each pair of openings being spaced 180° apart around the periphery of the sleeve, whereby the openings of any one of said pairs may be brought into registry with each other and with the central opening of a plate adapted to be inserted within the sleeve.

14. A wiper element of the type described comprising, a flexible sleeve; two pairs of openings in the wall of the sleeve, each pair of openings being spaced 180° apart around the periphery of the sleeve, whereby either one of said pairs of openings may be brought into registry, and into registry with the central opening of a plate adapted to be inserted within the sleeve and the other pair of openings may receive retaining means on the ends of said plate.

References Cited in the file of this patent

UNITED STATES PATENTS

| | | |
|---|---|---|
| 1,563,180 | Fournier | Nov. 24, 1925 |
| 1,840,334 | Schuster | Jan. 12, 1932 |
| 2,215,377 | Penfield et al. | Sept. 17, 1940 |
| 2,514,817 | Wheaton | July 11, 1950 |
| 2,653,334 | Bay | Sept. 29, 1953 |
| 2,697,240 | Barnes et al. | Dec. 21, 1954 |